Aug. 22, 1939.   J. H. SHARP   2,170,280
CHURN
Filed Oct. 10, 1938   2 Sheets-Sheet 1
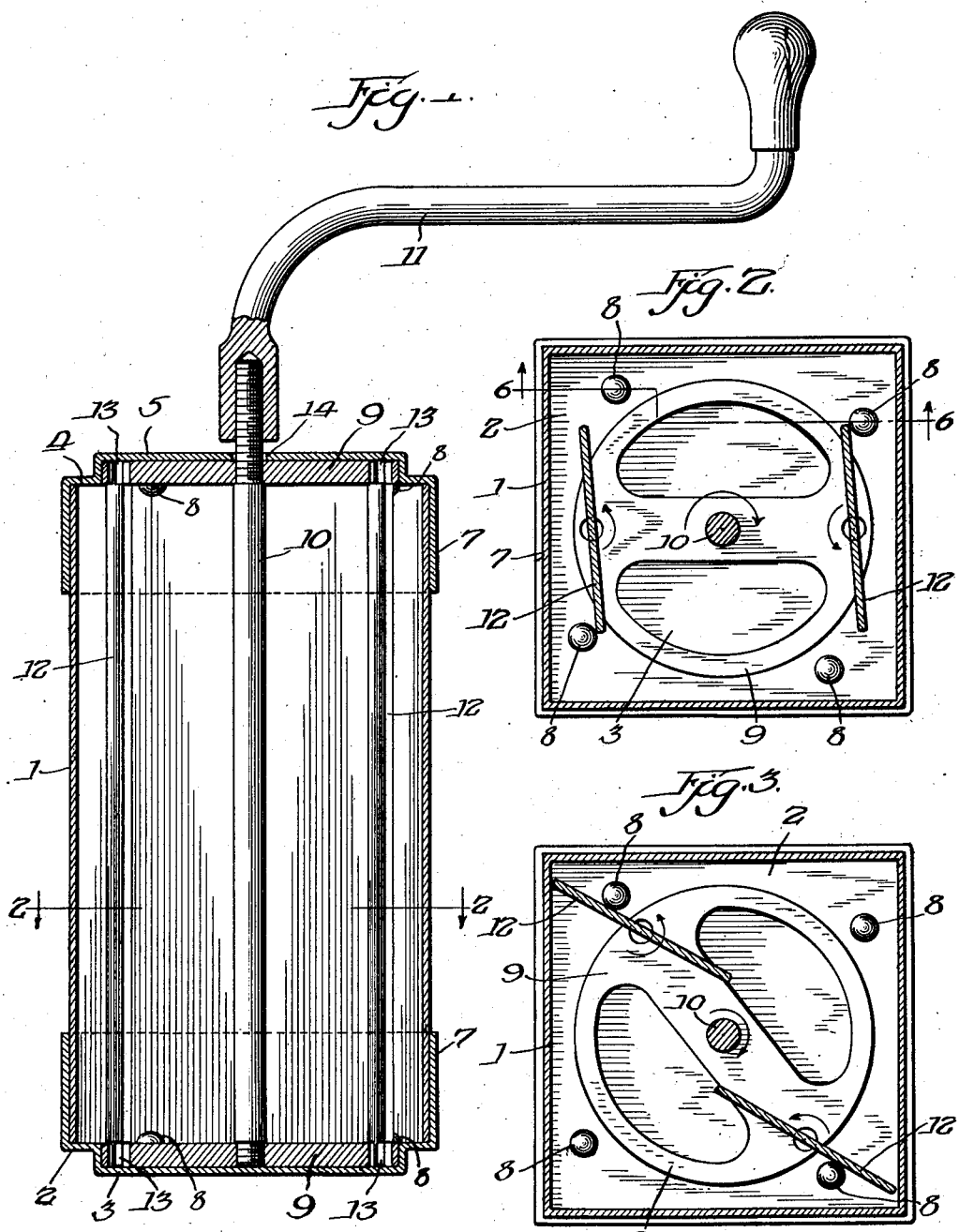
Inventor:
John H. Sharp Aug. 22, 1939.    J. H. SHARP    2,170,280
CHURN
Filed Oct. 10, 1938    2 Sheets-Sheet 2
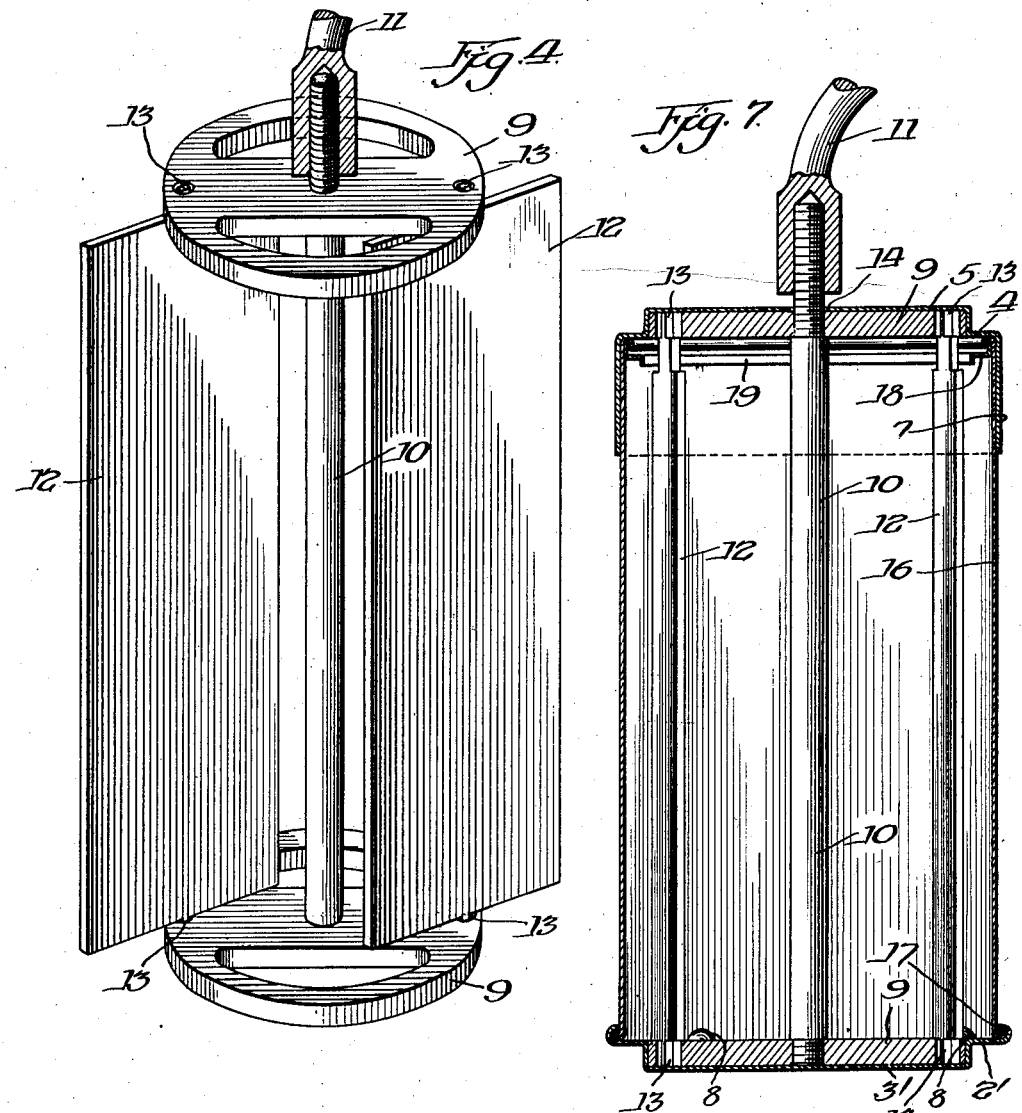
Inventor,
John H. Sharp Patented Aug. 22, 1939

2,170,280

UNITED STATES PATENT OFFICE 2,170,280

CHURN

John H. Sharp, Chicago, Ill.

Application October 10, 1938, Serial No. 234,089

10 Claims. (Cl. 259—102)

My invention belongs to that general class of devices known as mixing machines or the like, and relates particularly to a mixing or agitating machine in the nature of a churn, which will thoroughly mix or commingle ingredients and produce a perfect and even mixture.

The invention has among its objects the production of an efficient, simple, convenient, inexpensive device of the kind described which may be made substantially small or compact and consist of a minimum number of parts. The device functions perfectly to produce a thorough and uniform mixture in a minimum of time and with a minimum of effort.

The device is particularly applicable for home use for mixing color in oleomargarine to improve the appearance and to provide a mold for the same after it has been thoroughly mixed, but its use is not limited to this application of the same.

As is known, oleomargarine is a churned product and is generally made with a skimmed milk base in which vegetable oils, taking the place of animal fats, are churned to produce synthetic butter. Properly compounded with the right kind of vegetable oils and skimmed milk, the product is in all respects considered favorably when compared to butter and is a boon to the poor on account of the greatly reduced price. Fats of this nature are essential to the well-being of the poor, but to prevent misrepresentation and sale of synthetic butter under the guise of its being natural butter, the pure food laws prevent the coloring of oleomargarine by the manufacturer. For appearance sake, the public wants oleomargarine colored to resemble butter, and it is perfectly legal for the user to color the oleomargarine and lawful for them to be supplied with the color by the manufacturer just as the butter manufacturer does, the individual user coloring his own oleomargarine. This color, to be properly mixed, requires that the butterine or oleomargarine must be softened or melted and then the color mixed in, after which the same may be chilled or allowed to cool and set again. Generally heretofore the individual user has mixed the color with a spoon, fork, paddle or fingers in a bowl. As a result of the butterine or oleomargarine being a churned product, when it melts it tends to separate into its constituent parts, destroying the mix and producing a disagreeable combination of flavors.

My improved apparatus is designed to permit and facilitate the mixing of the color with the oleomargarine by providing a small, compact, convenient churn, whereby the colors and ingredients may be thoroughly churned as they would be in the manufacture of butter or in the manufacture of the uncolored oleomargarine itself. My device is not only a great convenience, but it is a great time saver, it permits the thorough mixing of small quantities, it eliminates waste and muss, it thoroughly churns and mixes all the ingredients with the coloring matter, eliminating the separation of material and resulting offensive combinations of flavors, and provides a most convenient mold for molding the brick so that it presents an attractive and appetizing appearance.

The apparatus is not confined in its use, however, to the churning of oleomargarine and its constituent parts; it may be employed to make ice cream, to whip cream or salad dressing, and other food products, and is particularly adapted and ideal for thoroughly mixing paints as well as numerous other ingredients which it is desired to combine or to thoroughly stir. Paint being a combination of lead or zinc and oils, together with coloring matter, does not properly protect the surface unless it is very thoroughly comixed. A paint can standing on the dealer's shelf for any time at all permits a settling of the solids and separation from the oil, and inefficient mixing results in uneven coating and protection of surfaces. The usual method is to mix with a stick, brush or paddle, requiring much time, resulting in more or less waste, and almost invariably resulting in a poor and uneven mixture, particularly unless the mixing is done by an experienced person and even then leaves much to be desired. My apparatus thoroughly churning all of the ingredients in the paint can or receptacle, insures a proper mix, increasing the life of the paint, and insures proper protection of the surface to which the paint is to be applied, prevents waste and reduces the mixing time to a small fraction of that necessary to get the proper mix, and avoids the improper and imperfect mix accomplished by other methods. It enables the manufacturer to provide the home owner or user with apparatus for thoroughly remixing what is generally known as a ready mixed paint,—that is, the type of paints which are mixed at the factory, placed in cans and shipped out to dealers, where they may be in storage or on the shelves for weeks or even months before sale and use. The user with my apparatus is enabled to turn out a perfect mix just prior to using the paint.

While I have mentioned the churning of oleomargarine and the mixing of paints, numerous other uses of the apparatus will be obvious and the same may be used wherever it is found applicable.

Many other objects and advantages of the construction herein shown and described will be obvious to those skilled in the art from the disclosure herein given.

To this end my invention consists in the novel construction, arrangement and combination of parts herein shown and described and more particularly pointed out in the claims.

In the drawings, wherein like reference characters indicate like or corresponding parts:

Fig. 1 is a longitudinal sectional view through one embodiment of my device;

Fig. 2 is a sectional view taken substantially on line 2—2 of Fig. 1;

Fig. 3 is a similar view showing the blades in changed position;

Fig. 4 is a perspective view of the blades and assembly parts;

Fig. 5 is a perspective view of one end of the container shown in Fig. 1;

Fig. 6 is a sectional view taken substantially on line 6—6 of Fig. 2; and

Fig. 7 is a view similar to Fig. 1 illustrating another embodiment of the invention.

Referring to the drawings, there is provided a container consisting of the side walls 1, bottom 2 and top 4, the cross sectional shape of the same being preferably square or rectangular. The container and ends may be made of any suitable material, preferably metal, either cast or shaped by stamping or otherwise, and as shown the ends or closures 2 and 4 are stampings provided with outwardly offset portions 3 and 5 forming recesses at the inner sides thereof which serve as bearings or trunnions for the blade assembly. One or both ends, as shown both ends, are provided with projections or detents 8 arranged substantially as shown about the recesses, these projections being in the form of pins or, as most clearly illustrated in Fig. 6, in the form of inwardly extending indentations. These have as their purpose the engagement with the blades, as will be more fully described hereinafter.

In the form of device illustrated in Figs. 1 to 6, the ends are provided with the flanges 7 and frictionally held in place, it being understood that they may be arranged to threadedly engage the shell or wall 1 of the container or be connected thereto by the wall in the form of the well known bayonet joint or the like. The interior and exterior finish of the container and associated parts may be such as is preferred.

Arranged within the container and seated in the recesses in the ends are the members or plates 9 which are substantially circular discs connected together by the rod or shaft 10 so as to be maintained in assembled relation. The rod or shaft 10 may be provided with any suitable form of handle 11 or equivalent driving means, the assembly being rotatable about the axis of the shaft 10. In the small type of device shown, this is in the form of a manually operated handle which will rotate the unit, the discs of which are arranged in the recesses and trunnioned therein. Extending between and carried by the members 9 are blades 12, these being rotatably secured in the members 9 by means of the extending portions 13 or their equivalents and of a length to overlie the ends 2 and 4 and engage the projections 8. Obviously, as the members 9 and shaft 10 are rotated about the common axis extending through the shaft 10, the blades 12 will be carried and revolve around the common axis. However, as they are carried around, the end edges of each one will successively engage with detents 8, tending to turn or rotate the blade about its own axis. The detents engage each blade on one side and turn it and when the blade reaches the next adjacent detent, its opposite side will engage that detent and the rotation continues. These blades, therefore, not only revolve about the common axis, but rotate about their own axes, the whole however constituting a unit assembly of blades and blade carrier.

In use, the materials to be mixed are placed in the container and then the mixing unit or assembly inserted, the cover sealing the end of the container. As the blades are carried about the common axis and rotate about their own axes, they tend to thoroughly churn and comix the contents of the container, and it will be noted by referring to Fig. 3, in which the blades are shown in changed position, they extend well into the corners of the container so that the contents of the same is mixed well from the center throughout the cross sectional area of the device. The violence of the mixing, of course, depends upon the speed at which the shaft 10 is turned. In the case of coloring oleomargarine, the melted materials and color, together with any other desired ingredients, are placed in the container and the same operated. After being thoroughly comixed, the mixing unit may be removed and the container set in a cool place and the contents allowed to set or harden, after which the opposite end may be removed from the container and the brick of material pushed out from the shell 1 to be employed as desired.

In the embodiment of the invention shown in Fig. 7, there is shown a container suitable for the shipping of paints or other liquids, as well as the storage thereof ready for use. When the same is to be used, one end of the container may be removed and the mixing unit inserted and the contents of the container or can thoroughly comixed. In this instance 2' is a cover or end provided with recessed portions 3' which may be secured to the wall 16 by means of the usual lock seam 17 or any equivalent construction. The upper end of the container is shown constructed to receive a friction top or cover, 18 representing the top with the opening adapted to receive the removable friction cover which is not shown. After the friction cover is removed the mixing element may be inserted in the receptacle or can, the flanges 7 overlying the sides of a can at the top thereof. Obviously, the two ends of the can may be constructed the same if desired.

In shipping and storage it is preferred to ship or store the can with the removable cover end down so that if the contents settle to the bottom, as is usual with paint, when the same is up-ended as shown in Fig. 7, the solids will drop down to the bottom. Any adhering to the friction cover may be removed and scraped off back into the can. The mixing unit is then positioned as shown in Fig. 7 and the blades operated to thoroughly mix the contents of the can.

It is believed that the construction and operation of the device and the many possible uses of the same will be clear from the foregoing description. The receptacles being square or rectangular in shape, permit the forming of attractive bricks in the case of oleomargarine molding or the like, and in the case of paints or like commodities, the square can shown in Fig. 7 may be readily stored in a compact space.

Having thus described my invention, it is obvious that various immaterial modifications may be made in the same without departing from the spirit of my invention; hence, I do not wish to be understood as limiting myself to the exact form, construction, arrangement and combination of parts herein shown and described, or uses mentioned.

What I claim as new and desire to secure by Letters Patent is:

1. In a mixing device of the kind described, a container having a removable top, an agitating unit arranged within the container consisting of a pair of spaced members connected together and journaled in the ends of the container and constituting the blade carrier, a plurality of blades pivotally mounted on said carrier and rotatable therewith about a common axis, each of said blades independently rotatable about its own axis in said carrier, and means arranged on one end of the container operative to successively engage the blades during the movement of the carrier about said common axis whereby each blade is independently and intermittently rotated about its own axis while revolving about the common axis.

2. In a mixing device of the kind described, a container comprising side walls, a bottom and a top, an agitating unit arranged within the container consisting of spaced members connected together and constituting a blade carrier, a plurality of blades pivotally mounted on said carrier and rotatable therewith about a common axis, each of said blades independently rotatable about its own axis on said carrier, and means arranged within the container operative to engage the blades during their movement about said common axis whereby each is independently rotated about its own axis during its revolving about the common axis.

3. In a mixing device of the kind described and in combination, a closed container having a removable closure, agitating means arranged in the container comprising a pair of spaced members rotatably mounted within the container, a shaft rigidly connecting said members and projecting from one end of the container, blades disposed between and each pivotally and independently carried by said members, and fixed means within the container for successively engaging said blades during the rotation of said members whereby the blades are rotated between the members during the rotation of the members and blades about a common axis.

4. In a mixing device of the kind described and in combination, a container consisting of a rectanguler shell provided with a bottom and a top, agitating means arranged therein comprising a pair of spaced members arranged within the container and journaled at the top and bottom thereof, a shaft rigidly connecting said members and projecting from the top of the container, blades disposed between said members and pivotally carried thereby at their ends, and means for engaging and deflecting said blades during the rotation of said members whereby the blades are intermittently rotated between the plates during the rotation of the plates and blades about a common axis.

5. In a mixing device of the kind described, a container comprising side walls, a bottom and a top, the top and bottom provided with annular recesses on the inner sides thereof constituting carrier trunnions, a carrier arranged within the container consisting of a pair of spaced members connected together and rotatable in said recesses about a common axis, means for rotating said carrier from the exterior of the container, a pair of blades arranged in said carrier and pivotally mounted on said members on axes parallel with the common axis of the carrier, one of the container ends provided with a plurality of inwardly extending detents so disposed as to successively engage the blades during the rotation of the carrier whereby each blade is turned substantially through 90 degrees at each engagement with a detent.

6. In a mixing device of the kind described, a rectangular container comprising side walls, and ends constituting a bottom and a closure top, said top and bottom provided with annular recesses on the inner sides thereof constituting carrier trunnions, a carrier rotatably arranged within the container consisting of a pair of spaced members rigidly connected together and rotatable in said recesses about a common axis, means for rotating said carrier, blades pivotally mounted on said carrier members on axes parallel with the common axis of the carrier, one of the container ends provided with a plurality of inwardly extending detents disposed adjacent the corners of the end and operative to successively engage the blades during the rotation of the carrier whereby each blade is turned substantially through 90 degrees at each engagement with a detent and successively projects adjacent the corners at the junctues of the side walls of the container.

7. A container having ends provided with recesses constituting bearings, one end being removable from the container, a rotatable stirrer consisting of members positioned in said recesses and rotatable therein, means for rotating said members, blades extending between and rotatably carried by said members, means for deflecting the blades during the rotation of the members whereby the blades are independently rotated between the members during the rotation of the members and blades about a common axis.

8. A churn provided with a tubular rectangular housing having ends constituting closures, each of said ends provided with a recess at the inner side constituting a trunnion for a cooperative removable rotatable mixing unit having a plurality of blades rotatable on axes parallel with the longitudinal axis of the unit, one closure provided with inwardly projecting detents disposed about the recess therein and of a length to engage the blades of the inserted mixing unit during the rotation of the unit.

9. An agitator unit comprising a plate member, a carrier journalled in said member, a plurality of blades pivotally secured to said carrier and independently rotatable on axes extending in the same direction as the axis of rotation of said carrier relative said plate member, and means on the latter engageable with said blades for successively deflecting and intermittently rotating the same as the carrier is rotated relative said plate.

10. A container for use with mixing devices having rotatable stirring blades consisting of a shell provided with closures for the ends, one of said closures having a removable portion and the opposite closure a recess at the inner side thereof constituting a bearing for a mixing device and inwardly extending blade engaging detents disposed at spaced intervals on one of said closures.

JOHN H. SHARP.